(12) United States Patent
Ahn

(10) Patent No.: US 9,746,971 B2
(45) Date of Patent: Aug. 29, 2017

(54) TOUCH SENSING DEVICE AND DRIVING METHOD THEREOF

(71) Applicant: Samsung Display Co., Ltd., Yongin (KR)

(72) Inventor: Soon-Sung Ahn, Yongin (KR)

(73) Assignee: Samsung Display Co., Ltd., Yongin-si (KR)

(*) Notice: Subject to any disclaimer, the term of this patent is extended or adjusted under 35 U.S.C. 154(b) by 141 days.

(21) Appl. No.: 14/269,971

(22) Filed: May 5, 2014

(65) Prior Publication Data

US 2014/0333577 A1 Nov. 13, 2014

(30) Foreign Application Priority Data

May 9, 2013 (KR) .......... 10-2013-0052630

(51) Int. Cl.
*G06F 3/044* (2006.01)
*G06F 3/041* (2006.01)

(52) U.S. Cl.
CPC .......... *G06F 3/044* (2013.01); *G06F 3/0414* (2013.01); *G06F 3/0418* (2013.01)

(58) Field of Classification Search
CPC ........ G06F 3/041; G06F 3/044; G06F 3/0488; G06F 3/0202; G06F 3/0234; G06F 3/0418; G06F 3/0481; G06F 2203/04105; G06F 3/0414; G06F 2203/04103; G06F 2203/04104; H03K 17/9622; H03K 17/9643; H03K 17/962; H03K 2217/960755; G01L 1/142; G01L 9/0072; G01L 9/12; B81B 2201/0264

USPC ............ 178/18.01–18.03, 18.05–18.06; 345/173–174
See application file for complete search history.

(56) References Cited

U.S. PATENT DOCUMENTS

| | | | |
|---|---|---|---|
| 8,766,945 B2 * | 7/2014 | Jogo | G06F 3/041 345/173 |
| 2009/0242282 A1 | 10/2009 | Kim et al. | |
| 2010/0017710 A1 | 1/2010 | Kim et al. | |
| 2010/0024573 A1 * | 2/2010 | Daverman et al. | 73/862.626 |
| 2010/0212974 A1 * | 8/2010 | Kim | 178/18.03 |

(Continued)

FOREIGN PATENT DOCUMENTS

| | | |
|---|---|---|
| KR | 10-2009-0074642 | 7/2009 |
| KR | 10-2009-0087351 | 8/2009 |
| KR | 10-2009-0104987 | 10/2009 |

(Continued)

*Primary Examiner* — Amare Mengistu
*Assistant Examiner* — Gloryvid Figueroa-Gibson
(74) *Attorney, Agent, or Firm* — H.C. Park & Associates, PLC

(57) ABSTRACT

A touch sensing device includes: a capacitive-type touch sensor, a pressure sensor, a touch coordinate detecting unit, and a direction vector calculating unit. The capacitive-type touch sensor is configured to detect a first aspect of a touch input. The pressure sensor is configured to detect a second aspect of the touch input. The touch coordinate detecting unit is configured to, based on the first and second aspects, determine a touch coordinate associated with the capacitive-type touch sensor and a touch coordinate associated with the pressure sensor. The direction vector calculating unit is configured to determine a direction vector based on the respective touch coordinates.

20 Claims, 4 Drawing Sheets

(56) References Cited

U.S. PATENT DOCUMENTS

2011/0037727 A1* 2/2011 Lee .................. G06F 3/0416
                                                345/174
2012/0013571 A1* 1/2012 Yeh .................. G06F 3/044
                                                345/174

FOREIGN PATENT DOCUMENTS

| KR | 10-2010-0009986 | 1/2010 |
| KR | 10-2011-0133174 | 12/2011 |

* cited by examiner

TOUCH SENSING DEVICE AND DRIVING METHOD THEREOF

CROSS-REFERENCE TO RELATED APPLICATION

This application claims priority from and the benefit of Korean Patent Application No. 10-2013-0052630, filed on May 9, 2013, which is incorporated by reference for all purposes as if set forth herein.

BACKGROUND

Field

Exemplary embodiments relate to a touch sensing device and a method of driving the same.

Discussion

A digitizer may be utilized in association with a touch screen to directly detect a contact position of a human hand or an object to replace conventional input devices, such as a keyboard, mouse, etc. The digitizer and/or touch screen may include touch sensors configured to detect touch positions utilizing, for example, capacitive-type touch sensors, resistance layer type-touch sensors, photo-sensing-type touch sensors, and/or the like. Among the aforementioned types of touch sensors, the capacitive-type touch sensor is typically configured to detect a point in which electrostatic capacity is changed in accordance with contact of a human hand or an object on or over a touch position. It is noted that these capacitive-type touch sensors are attractive because multi-touch events may be easily detected with relative high accuracy.

The above information disclosed in this Background section is only for enhancement of understanding of the background of the invention, and, therefore, it may contain information that does not form the prior art that is already known in this country to a person of ordinary skill in the art.

SUMMARY

Exemplary embodiments provide a touch sensing device and a method of driving the same.

Additional aspects will be set forth in the detailed description which follows and, in part, will be apparent from the disclosure, or may be learned by practice of the invention.

According to exemplary embodiments, a touch sensing device includes: a capacitive-type touch sensor, a pressure sensor, a touch coordinate detecting unit, and a direction vector calculating unit. The capacitive-type touch sensor is configured to detect a first aspect of a touch input. The pressure sensor is configured to detect a second aspect of the touch input. The touch coordinate detecting unit is configured to, based on the first and second aspects, determine a touch coordinate associated with the capacitive-type touch sensor and a touch coordinate associated with the pressure sensor. The direction vector calculating unit is configured to determine a direction vector based on the respective touch coordinates.

According to exemplary embodiments, a method includes: detecting, in association with a reference vector setting mode, a first touch coordinate for a first touch input based on information associated with a capacitive-type touch sensor and a second touch coordinate for the first touch input based on information associated with a pressure sensor; determining a reference vector using the first and second touch coordinates detected in association with the reference vector setting mode; detecting, in association with a touch detecting mode, a third touch coordinate for a second touch input based on information associated with the capacitive-type touch sensor and a fourth touch coordinate for the second touch input based on information associated with the pressure sensor; and determining a direction vector using the third and fourth touch coordinates detected in association with the touch detecting mode.

According to exemplary embodiments, a method includes: detecting first spatial information associated with a touch event based on information received from a touch sensor; detecting second spatial information associated with the touch event based on information received from a pressure sensor; and determining a vector utilizing the first and second spatial information.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
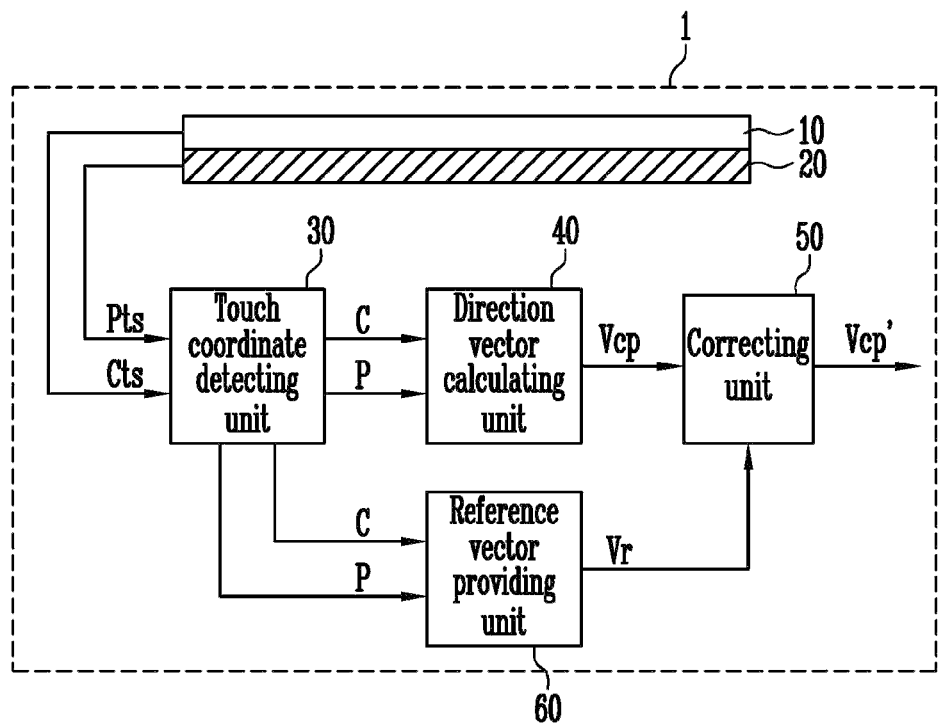
FIG. 1 is a block diagram of a touch sensing device, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a block diagram of a touch sensing device, according to exemplary embodiments.

Referring to FIG. 1, a touch sensing device 1 may include a touch sensor 10, a pressure sensor 20, a touch coordinate detecting unit 30, a direction vector calculating unit 40, a correcting unit 50, and a reference vector providing unit 60. Although specific reference will be made to this particular implementation, it is also contemplated that the touch sensing device 1 may embody many forms and include multiple and/or alternative components. For example, it is contemplated that the components of the touch sensing device 1 may be combined, located in separate structures, and/or separate locations.

According to exemplary embodiments, the touch sensor 10 is configured to detect touch events applied to the touch sensing device 1 by detecting touch coordinates based on electrostatic capacity generated by the touch event. In this manner, the touch sensor 10 may be considered a capacitive-type touch sensor 10. To this end, the touch sensor 10 may be a self-capacitive-type or a mutual capacitive-type type touch sensor.

The pressure sensor 20 is configured to sense a physical force, e.g., a pressure applied by an actual touch event to the touch sensing device 1. In this manner, the sensation of the physical force may be utilized to detect touch coordinates of the actual touch event. It is noted that any suitable pressure sensor may be utilized, such as, for example, a piezoelectric pressure sensor, may be used to implement the pressure sensor 20.

When a touch input is generated, the touch sensor 10 and the pressure sensor 20 may respectively perform operations to detect one or more aspects of the touch input. To this end, touch coordinates detected by the touch sensor 10 and/or the pressure sensor 20 in association with a touch input may vary with a touch method of a user.

According to exemplary embodiments, the touch sensor 10 and the pressure sensor 20 may respectively detect one or more aspects of a touch event, and, as such, the touch sensor 10 and the pressure sensor 20 may be positioned to overlap each other, as illustrated in FIG. 1. For example, the pressure sensor 20 may be coupled to a top or bottom surface of the touch sensor 10. As such, a user may perform a touch input operation on the surface of the touch sensor 10 or the pressure sensor 20 that is exposed to the outside of the touch sensing device 1.

The touch coordinate detecting unit 30 may be configured to detect a touch coordinate C for the touch input through the touch sensor 10 and/or may detect a touch coordinate P for the touch input through the pressure sensor 20 when a touch input is generated. In this manner, the touch coordinate detecting unit 30 may be positioned in the touch sensor 10 or the pressure sensor 20. It is also contemplated that the touch coordinate detecting unit 30 may be separately positioned in the touch sensor 10 and the pressure sensor 20, or may be positioned outside the touch sensor 10 and the pressure sensor 20, and, thereby, disposed in communication with the touch sensor 10 and the pressure sensor 20.

According to exemplary embodiments, the touch coordinate detecting unit 30 may detect the touch coordinate C associated with the touch sensor 10 using a touch sensing signal Cts output from the touch sensor 10. The touch coordinate detecting unit 30 may detect the touch coordinate P associated with the pressure sensor 20 using a touch sensing signal Pts output from the pressure sensor 20.

The direction vector calculating unit 40 may be configured to calculate (or otherwise determine) a direction vector Vcp using the touch coordinate C detected by the touch sensor 10 and the touch coordinate P detected by the pressure sensor 20. The direction vector Vcp may be defined as a vector using the touch coordinate C detected by the touch sensor 10 as a start point and the touch coordinate P detected by the pressure sensor 20 as an end point. In this manner, various functions may be realized using the direction vector Vcp calculated by the direction vector calculating unit 40. These functions may relate to one or more features associated with a device incorporating or utilizing the touch sensing device 1 as an input mechanism thereof.

According to exemplary embodiments, a user may contact a finger to a surface of the touch sensing device 1, and, in this manner, may only change the pressure applied to a contact point to change a direction and a magnitude of the direction vector Vcp. In this manner, various functions may be performed to correspond to a change in the direction and magnitude of the direction vector Vcp.

When a touch screen including the touch sensing device 1, according to exemplary embodiments, is taken as an example, the change in the direction of the direction vector Vcp may be recognized so that an object (for example, a character, an icon, a letter, a picture, etc.) displayed on the touch screen may be moved and the change in the magnitude of the direction vector Vcp may be recognized so that a movement speed of the object displayed on the touch screen may be controlled. In addition, a function of changing an input character (e.g., alphabet letter) into a capital letter or a small letter may be performed in accordance with the direction of the direction vector Vcp. This is but one of numerous functions that may be performed based on the determination of the direction vector Vcp. As such, various modifications other than the above-described example may be released.

The correcting unit 50 may be configured to correct an error of the direction vector Vcp. For instance, although a user may perform a touch input so that the touch coordinate C detected by the touch sensor 10 and the touch coordinate P detected by the pressure sensor 20 have a same position, the actually detected touch coordinates C and P may actually have different positions in accordance with differences in the shapes of fingers, touch habits, touch detecting methods, etc., of users. As such, to compensate for these differences, the correcting unit 50 may be configured to correct (or otherwise modify) the direction vector Vcp using a previously set reference vector Vr. In this manner, the correcting unit 50 may output a corrected direction vector Vcp'. For example, the correcting unit 50 may perform a correction whereby the reference vector Vr is subtracted from the direction vector Vcp to calculate (or otherwise determine) the corrected direction vector Vcp'.

According to exemplary embodiments, the reference vector Vr may be received from a reference vector providing unit 60. In this manner, the reference vector providing unit 60 may perform a function of providing the reference vector Vr to the correcting unit 50. In addition, the reference vector providing unit 60 may generate the reference vector Vr based on one or more characteristics of users. To this end, the reference vector providing unit 60 may calculate the reference vector Vr using the touch coordinate C detected by the touch sensor 10 and/or the touch coordinate P detected by the pressure sensor 20 when a touch input is generated after a mode is changed from a common mode (for example, a touch detecting mode) to a specific mode (for example, a reference vector setting mode). A method of calculating (or determining) the reference vector Vr may be the same as a method of calculating the direction vector Vcp.

According to exemplary embodiments, the touch coordinate detecting unit 30, the direction vector calculating unit 40, the correcting unit 50, the reference vector providing unit 60, and/or one or more components thereof may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

In exemplary embodiments, the processes described herein may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. In this manner, the touch coordinate detecting unit 30, the direction vector calculating unit 40, the correcting unit 50, the reference vector providing unit 60, and/or one or more components may include or otherwise be associated with one or more memories (not shown) including code (e.g., instructions) configured to cause the touch coordinate detecting unit 30, the direction vector calculating unit 40, the correcting unit 50, the reference vector providing unit 60, and/or one or more components thereof to perform one or more of the features/functions/processes described herein.

The memories may be any medium that participates in providing code/instructions to the one or more software, hardware, and/or firmware for execution. Such memories may take many forms, including but not limited to non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Figure 2:
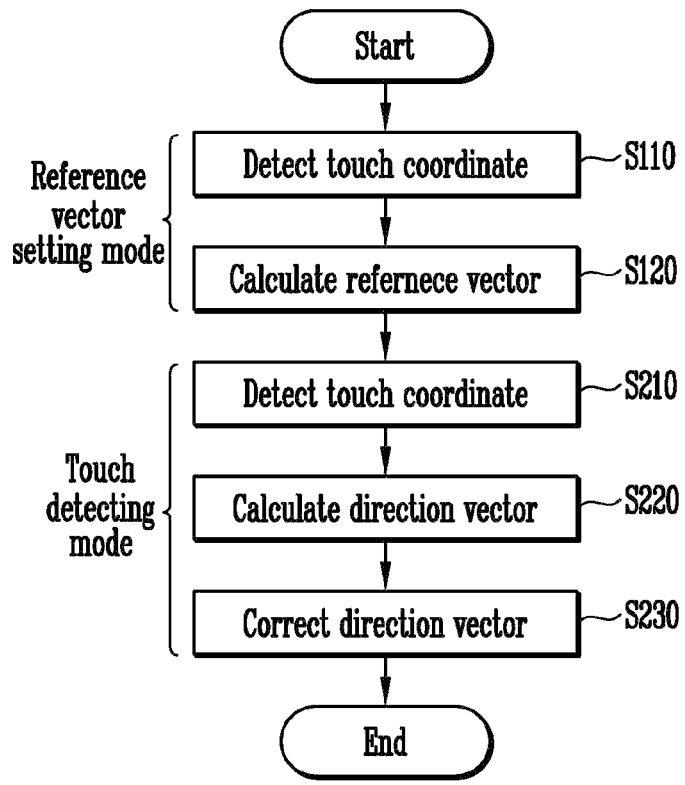
FIG. 2 is a flowchart of a process for driving a touch sensing device, according to exemplary embodiments.
Figure 3A:
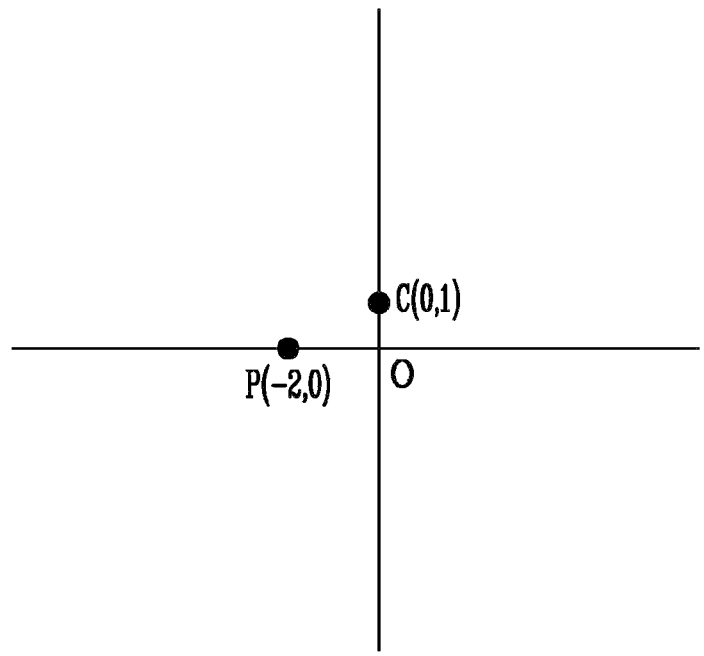
FIGS. 3A and 3B are reference diagrams of processes for calculating a reference vector, according to exemplary embodiments.
Figure 3B:
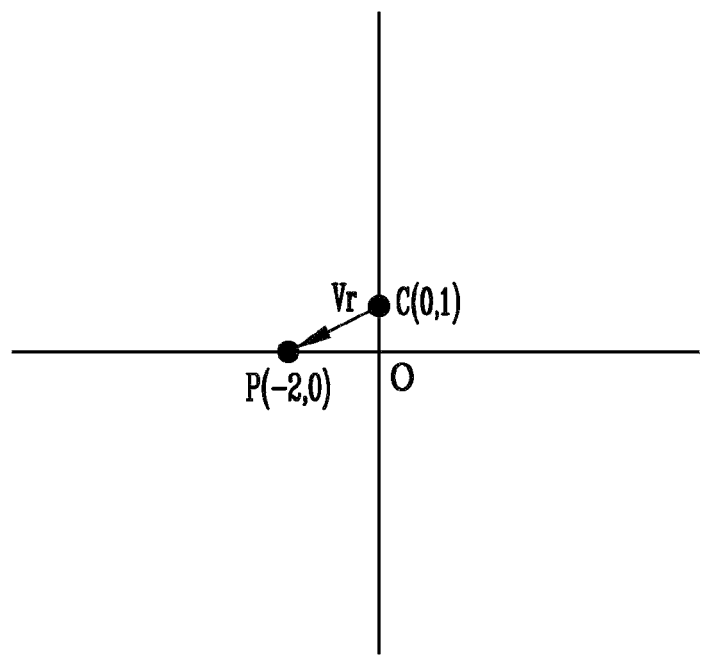
Figure 4A:
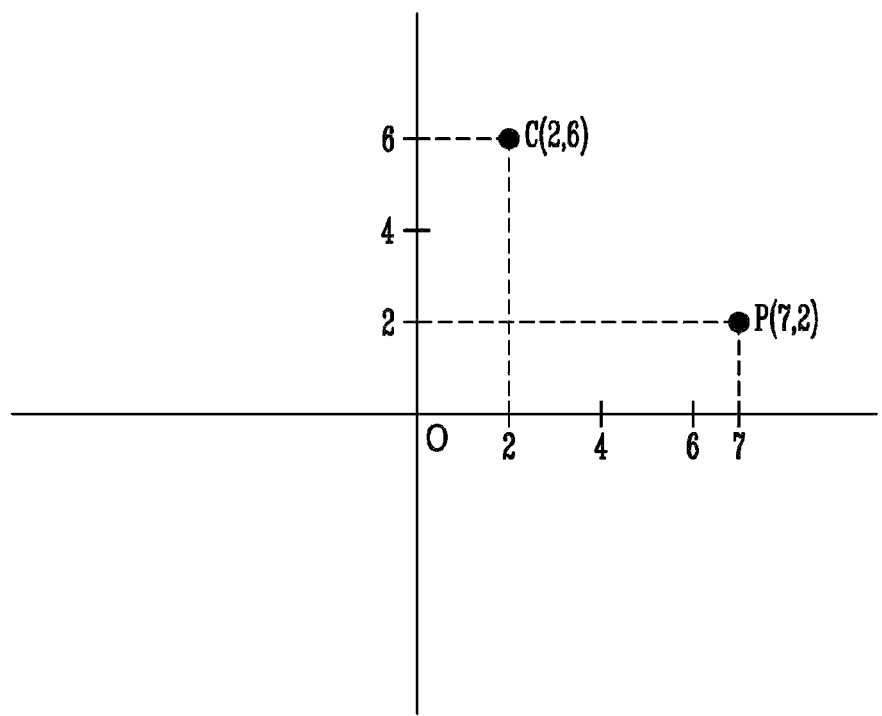
FIGS. 4A and 4B are reference diagrams of processes for calculating a direction vector, according to exemplary embodiments.
Figure 4B:
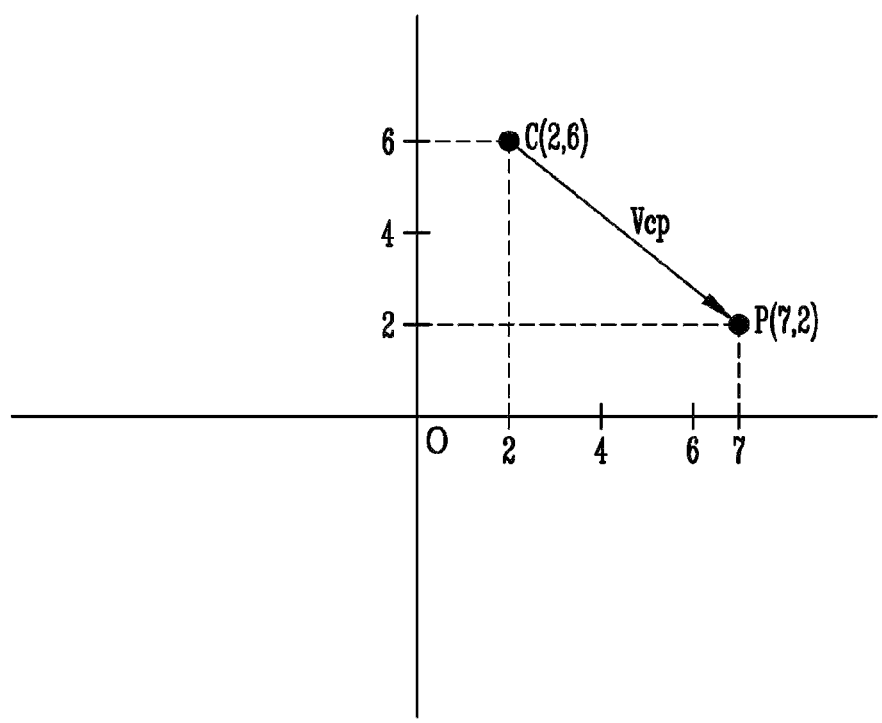

FIG. 2 is a flowchart of a process to drive a touch sensing device, according to exemplary embodiments. FIGS. 3A and 3B are reference diagrams of processes for calculating a reference vector Vr, whereas FIGS. 4A and 4B are reference diagrams of processes for calculating a direction vector Vcp, according to exemplary embodiments.

Referring to FIGS. 2, 3A, 3B, 4A, and 4B, a first touch coordinate may be detected S110, a reference vector may be calculated S120, and a second touch coordinate may be detected S210, and a direction vector may be calculated S220.

According to exemplary embodiments, detecting the first touch coordinate S110 and calculating the reference vector S120 may be performed in a first, e.g., specific, mode (for example, a reference vector setting mode) and detecting the second touch coordinate S210 and calculating the direction vector S220 may be performed in a second, e.g., common, mode (for example, a touch detecting mode). In accordance with, for example, a request of a user, the mode may be changed from the touch detecting mode to the reference vector setting mode. In addition, when the calculation of the reference vector Vr is complete or a termination request of a user is received after the mode has been changed to the reference vector setting mode, the reference vector setting mode may be terminated and the mode may return to the touch detecting mode. In this manner, users may be allowed to toggle between the touch detecting mode and the reference vector setting mode.

In detecting the first touch coordinate S110, when a touch input is generated in the reference vector setting mode, the touch coordinate C for the touch input is detected by the touch sensor 10 and the touch coordinate P for the touch input may be detected by the pressure sensor 20. In this manner, the touch coordinates illustrated in FIG. 3A may be detected. For example, the coordinates C and P of the touch input applied to the touch sensing device 1 in the reference vector setting mode may be detected by the touch sensor 10 as (0, 1) and may be detected by the pressure sensor 20 as (−2, 0), respectively.

Detecting the first touch coordinate S110 may be performed by the touch coordinate detecting unit 30 of the touch sensing device 1. In calculating the reference vector Vr S120, the reference vector Vr may be calculated using the two touch coordinates detected in detecting the first touch coordinate S110. That is, in calculating the reference vector Vr S120, the reference vector Vr may be calculated using the touch coordinate C detected by the touch sensor 10 and the touch coordinate P detected by the pressure sensor 20. In this manner, the reference vector Vr may use the touch coordinate C detected by the touch sensor 10 as a start point and may use the touch coordinate P detected by the pressure sensor 20 as an end point. For example, the reference vector Vr may be calculated as illustrated in FIG. 3B.

According to exemplary embodiments, calculating the reference vector Vr S120 may be performed by the reference vector providing unit 60. When the calculation of the reference vector Vr is complete, the reference vector setting mode may be terminated so that the mode may return to the touch detecting mode; that is, the common mode.

In detecting the second touch coordinate S210, when a touch input is generated in the touch detecting mode, the touch coordinate C for the touch input may be detected by the touch sensor 10, and the touch coordinate P for the touch input may be detected by the pressure sensor 20. In this manner, the touch coordinates illustrated in FIG. 4A may be detected. For example, the coordinate C of the touch input applied to the touch sensing device 1 in the touch detecting mode may be detected by the touch sensor 10 as (2, 6) and may be detected by the pressure sensor 20 as (7, 2), respectively.

Detecting the second touch coordinate S210 may be performed by the touch coordinate detecting unit 30. In calculating the direction vector Vcp S220, the direction vector Vcp may be calculated using the two touch coordinates detected in detecting the second touch coordinate S210. That is, in calculating the direction vector S220, the direction vector Vcp may be calculated using the touch coordinate C detected by the touch sensor 10 and the touch coordinate P detected by the pressure sensor 20. In this manner, the direction vector Vcp may use the touch coordinate C detected by the touch sensor 10 as a start point and may use the touch coordinate P detected by the pressure sensor 20 as an end point. For example, the direction vector Vcp may be calculated as illustrated in FIG. 4B. To this end, calculating the direction vector Vcp S220 may be performed by the direction vector calculating unit 40.

Figure 5:
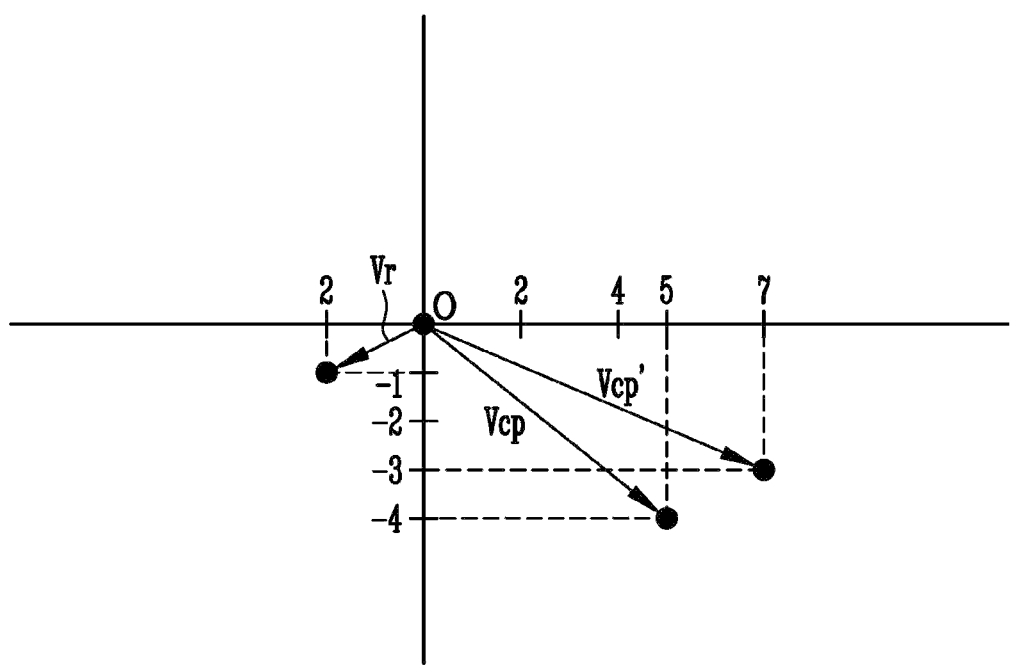
FIG. 5 is a reference diagram of processes for correcting a direction vector, according to exemplary embodiments.

FIG. 5 is a reference diagram of processes for correcting a direction vector, according to exemplary embodiments.

With reference to FIGS. 2 and 5, a driving method of the touch sensing device 1 may further include correcting a direction vector S230 to correct (or otherwise compensate for) a differences between the touch coordinate C detected by the touch sensor 10 and the touch coordinate P detected by the pressure sensor 20, which may relate to differences between users.

Correcting the direction vector Vcp S230 may be performed in the common mode (for example, the touch detecting mode) together with detecting the second touch coordinate S210 and calculating the direction vector S220. In correcting the direction vector Vcp S230, the direction vector Vcp calculated in calculating the direction vector Vcp S220 may be corrected using the reference vector Vr. For example, the corrected direction vector Vcp' may be defined as a difference between the direction vector Vcp and the reference vector Vr. As such, given that the corrected direction vector Vcp' may be calculated by subtracting the reference vector Vr from the direction vector Vcp, the corrected direction vector Vcp' as illustrated in FIG. 5 may be calculated or otherwise determined.

According to exemplary embodiments, when a user contacts, for example, a finger to the touch sensing device 1 and only changes a pressure that is applied to a contact area to change a direction and a magnitude of a touch input, the corrected direction vector Vcp' may be determined. In this manner, various functions may be performed to correspond to a change in the direction and magnitude associated with the corrected direction vector Vcp'.

According to exemplary embodiments, a pressure sensor 20 configured to measure strength of touch pressure may utilized in association with a capacitive-type touch sensor 10 to detect touch position, as well as touch events where only changes in a pressure applied to a contact area are input to change a direction and a magnitude of the touch input.

Although certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:
1. A touch sensing device, comprising:
  a capacitive-type touch sensor configured to detect only a first aspect of a touch input, the first aspect being capacitance;
  a pressure sensor configured to detect only a second aspect of the touch input, the second aspect being a force; and
  at least one processor configured to:
    determine, based on the first aspect, a touch coordinate associated with the capacitive-type touch sensor;
    determine, based on the second aspect, a touch coordinate associated with the pressure sensor; and
    determine a direction vector comprising the respective touch coordinates as end points of the direction vector.
2. The touch sensing device of claim 1, wherein the direction vector comprises the touch coordinate associated with the capacitive-type touch sensor as a tail end point and the touch coordinate detected by the pressure sensor as a head end point.

3. The touch sensing device of claim 1, wherein the at least one processor is further configured to modify the direction vector using a reference vector.

4. The touch sensing device of claim 3, wherein, in a reference vector setting mode:
the capacitive-type touch sensor is configured to detect the first aspect of another touch input;
the pressure sensor is configured to detect the second aspect of the another touch input; and
the at least one processor is configured to:
determine, based on the first and second aspects of the another touch input, determine another touch coordinate associated with the capacitive-type touch sensor and another touch coordinate associated with the pressure sensor; and
determine the reference vector based on the respective, another touch coordinates.

5. The touch sensing device of claim 3, wherein the at least one processor is configured to subtract the reference vector from the direction vector.

6. The touch sensing device of claim 1, wherein the capacitive-type touch sensor and the pressure sensor overlap one another.

7. The touch sensing device of claim 1, wherein the pressure sensor is disposed directly on a surface of the capacitive-type touch sensor.

8. The touch sensing device of claim 1, wherein:
the first aspect corresponds to a coordinate of the touch input; and
the second aspect corresponds to a pressure of the touch input.

9. A method, comprising:
detecting, in association with a reference vector setting mode, a first touch coordinate for a first touch input based on information associated with a capacitive-type touch sensor and a second touch coordinate for the first touch input based on information associated with a pressure sensor;
determining a reference vector using the first and second touch coordinates detected in association with the reference vector setting mode;
detecting, in association with a touch detecting mode, a third touch coordinate for a second touch input, which is different from the first touch input, based on information associated with the capacitive-type touch sensor and a fourth touch coordinate for the second touch input based on information associated with the pressure sensor; and
determining a direction vector using the third and fourth touch coordinates detected in association with the touch detecting mode.

10. The method of claim 9, wherein the direction vector comprises the third touch coordinate as a start point and the fourth touch coordinate as an end point.

11. The method of claim 9, further comprising:
correcting the direction vector using the reference vector.

12. The method of claim 11, wherein correcting the direction vector comprises:
subtracting the reference vector from the direction vector.

13. The method of claim 9, wherein the capacitive-type touch sensor and the pressure sensor overlap one another.

14. The method of claim 9, wherein the pressure sensor is disposed directly on a surface of the capacitive-type touch sensor.

15. A method, comprising:
detecting first spatial information associated with a touch event based on information received from a touch sensor configured to detect a touch coordinate of the touch event;
detecting second spatial information associated with the touch event based on information received from a pressure sensor configured to detect only a force aspect of the touch event; and
determining a vector comprising the first spatial information as a first end point of the vector and the second spatial information as a second end point of the vector.

16. The method of claim 15, wherein the touch sensor is a capacitive-type touch sensor.

17. The method of claim 15, further comprising:
detecting third spatial information associated with a second touch event based on information received from the touch sensor;
detecting fourth spatial information associated with the second touch event based on information received from the pressure sensor; and
determining another vector utilizing the third and fourth spatial information.

18. The method of claim 17, further comprising:
adjusting the vector based on the another vector.

19. The method of claim 18, wherein adjusting the vector comprises:
subtracting the another vector from the vector.

20. The method of claim 17, wherein:
the first and second spatial information is detected in association with a first touch detection mode; and
the third and fourth spatial information is detected in association with a second touch detection mode.

* * * * *